United States Patent [19]
Custer

[11] Patent Number: 5,437,156
[45] Date of Patent: Aug. 1, 1995

[54] APPARATUS FOR SELECTIVELY LOWERING INTAKE MANIFOLD PRESSURE OF TURBOCHARGED ENGINE DURING OPERATION OF ASSOCIATED COMPRESSION RELEASE ENGINE BRAKE

[75] Inventor: Dennis R. Custer, West Granby, Conn.

[73] Assignee: Jacobs Brake Technology Corporation, Wilmington, Del.

[21] Appl. No.: 153,603

[22] Filed: Nov. 16, 1993

[51] Int. Cl.⁶ .......................... F02B 37/00
[52] U.S. Cl. ........................ 60/611; 137/492.5
[58] Field of Search .................. 60/611; 123/564; 137/492.5

[56] References Cited

U.S. PATENT DOCUMENTS

| | | | |
|---|---|---|---|
| 912,503 | 2/1909 | Squires | 137/492.5 |
| 3,220,392 | 11/1985 | Cummins | |
| 4,429,532 | 2/1984 | Jakuba | |
| 4,688,384 | 8/1987 | Pearman et al. | 60/600 |

FOREIGN PATENT DOCUMENTS 2328494  1/1975  Germany .......................... 123/564

*Primary Examiner*—Michael Koczo
*Attorney, Agent, or Firm*—Fish & Neave; Robert R. Jackson

[57] ABSTRACT

In an internal combustion engine equipped with a turbocharger and a compression release engine brake, excessive stress in the engine and engine brake during operation of the engine brake at relatively high engine speeds is prevented by limiting the intake manifold pressure increase produced by the turbocharger, particularly at higher engine speeds. When the engine brake is turned on, a pressure sensor is enabled to sense the gas pressure in the intake manifold. When the pressure sensor detects that the intake manifold pressure is above a predetermined threshold level, the pressure sensor applies gas from the intake manifold to a pneumatic actuator. The pneumatic actuator opens a pressure relief valve which releases gas from the intake manifold to the ambient atmosphere.

17 Claims, 8 Drawing Sheets

APPARATUS FOR SELECTIVELY LOWERING INTAKE MANIFOLD PRESSURE OF TURBOCHARGED ENGINE DURING OPERATION OF ASSOCIATED COMPRESSION RELEASE ENGINE BRAKE

BACKGROUND OF THE INVENTION

This invention relates to compression release engine braking systems for turbocharged internal combustion engines, and more particularly to such systems in which increased engine braking horsepower can be provided at low and moderate engine speeds without unacceptably high stress on components of the engine and engine brake at high engine speeds.

Compression release engine brakes for internal combustion engines are well known as shown, for example, by Cummins U.S. Pat. No. 3,220,392. The purpose of such brakes is to convert the associated engine from a power source to a power sink when braking is desired. Such power sinking may be helpful to assist the wheel brakes of a vehicle (e.g., a tractor trailer truck) propelled by the engine, thereby prolonging the life of the wheel brakes and increasing the safety of operation of the vehicle. When engine braking is desired, the flow of fuel to the engine is cut off and the engine brake is turned on. Turning on the engine brake causes it to open at least one exhaust valve in at least one engine cylinder (preferably several or all engine cylinders) each time the piston in that cylinder nears top dead center of its compression stroke. This releases to the exhaust manifold of the engine the gas compressed in the cylinder and prevents the work done in compressing that gas from being recovered in the subsequent "power" stroke of the piston. The engine therefore dissipates the work of compressing the gas thus exhausted, and that dissipated work brakes the engine and the associated vehicle. In effect, the engine brake temporarily converts the engine to a gas compressor in order to make the engine absorb work or energy.

The typical compression release engine brake opens exhaust valves in the associated engine as described above by picking up an appropriately timed motion from another part of the engine and transmitting that motion to the exhaust valve or valves to be opened. For example, a fuel injector pushtube of one cylinder may be in motion when the engine brake needs to open the exhaust valve or valves of that cylinder or another cylinder. The engine brake may therefore be provided with a hydraulic circuit between a master piston operated by the fuel injector pushtube mechanism and a slave piston which operates on the exhaust valve mechanism. When the engine brake is turned on, this hydraulic circuit is sealed so that a fuel injector input to the master piston is transmitted to the slave piston, thereby causing the slave piston to open the associated exhaust valve or valves at the proper time.

If the engine associated with an engine brake is turbocharged, the force required from the engine brake to open the exhaust valves of the engine near top dead center of its compression strokes tends to increase substantially as engine speed increases and turbocharger effectiveness increases accordingly. A turbocharger uses the exhaust gases of the engine to spin a turbine. The turbine powers a rotary pump for forcing more gas into the intake manifold and cylinders of the engine. This increases the gas pressure in the cylinders, thereby increasing the force required to open the exhaust valves near top dead center of a compression stroke. A turbocharger has relatively little effect on the associated engine at low engine speed, but its effect increases substantially at higher engine speeds. When the engine is operating at high speed and the associated turbocharger is therefore highly effective, the force required from the engine brake in order to open the exhaust valves may become unacceptably high. For example, the load on the pushtube mechanism may exceed the load allowed on that mechanism by the engine manufacturer. This has typically necessitated adjusting the timing of the engine brake so that it does not attempt to open the exhaust valves so close to top dead center. However, this tends to reduce the effectiveness of the engine brake. Moreover, this reduction in engine brake effectiveness occurs at all engine speeds, even though the problem of unacceptably high loads or stresses only occurs at relatively high engine speeds.

Pearman et al. U.S. Pat. No. 4,688,384 shows pressure-sensitive relief valves for releasing gas from the intake manifold of a turbocharged engine when an engine brake associated with the engine is turned on and the intake manifold pressure exceeds the pressure required to open the relief valve. It has proven difficult, however, to produce systems of the type shown in the '384 patent that do not either suddenly and excessively drop the intake manifold pressure when the relief valve is opened, or that do not allow intake manifold pressure to continue to increase unacceptably even after the relief valve has begun to open. Commonly assigned, co-pending patent application Ser. No. 08/112,769, filed Aug. 26, 1993 shows apparatus for reducing turbocharger effectiveness during engine brake operation by somewhat restricting the flow of engine exhaust gas to or from the turbine of the turbocharger. However, this means placing moving parts in a high-temperature, particulate-laden environment.

In view of the foregoing, it is an object of this invention to provide compression release engine braking systems for turbocharged engines which provide increased engine brake effectiveness at low and moderate engine speeds without producing unacceptably high stresses in the engine and engine brake at high engine speeds.

It is another object of this invention to provide apparatus for smoothly and reliably reducing the increase in the pressure above a predetermined threshold pressure in the intake manifold of a turbocharged engine during operation of a compression release engine brake associated with the engine so that unacceptably high stresses in the engine and engine brake can be avoided at higher engine speeds.

SUMMARY OF THE INVENTION

These and other objects of the invention are accomplished in accordance with the principles of the invention by providing a valve for selectively releasing gas from the intake manifold of a turbocharged internal combustion engine equipped with a compression release engine brake. (As used herein and in the appended claims, the term "intake manifold" means any portion of the system between the turbocharger pump and the intake valves of the engine.) The intake manifold relief valve is operated by a pneumatic actuator. A pressure sensitive valve is responsive to the pressure of the gas in the intake manifold. The pressure sensitive valve has two positions: one in which it vents the pneumatic actuator through a relatively small vent passageway, and another in which the vent passageway is closed and another relatively small passageway is opened for gas to flow from the intake manifold into the pneumatic actuator. These passageways are said to be relatively small in relation to the gas volume of the pneumatic actuator so that, although the pressure sensitive valve may switch rapidly and, under some conditions, frequently back and forth between its two positions, the pneumatic actuator smoothes out or performs a time integration of the gas flows produced by the pressure sensitive valve. In particular, when the pressure sensitive valve is in the second of the above-described positions and gas is accordingly flowing from the intake manifold into the pneumatic actuator, the actuator increases the opening of the intake manifold relief valve in proportion to the inflow of gas from the intake manifold. On the other hand, when the pressure sensitive valve switches to the first of the above-described positions and gas is accordingly venting from the pneumatic actuator, the actuator decreases the opening of the intake manifold relief valve in proportion to the outflow of gas from the intake manifold. The effect of this system is to prevent intake manifold pressure from rising substantially above the threshold pressure at which the pressure sensitive valve switches from its first (actuator venting) position to its second (actuator pressurizing) position. This in turn prevents unacceptably high stresses in the engine or engine brake at relatively high engine speeds.

Further features of the invention, its nature and various advantages will be more apparent from the accompanying drawings and the following detailed description of the preferred embodiments.

BRIEF DESCRIPTION OF THE DRAWINGS

(FIG. 4 is taken in the direction indicated by the arrows 4—4 in FIG. 5.)

(FIG. 7 is taken along the line 7—7 in FIG. 10, and FIG. 8 is taken along the line 8—8 in FIG. 10. The sectional portion of FIG. 10 is taken along the line 10—10 in FIG. 7.)

DETAILED DESCRIPTION OF THE PREFERRED EMBODIMENTS

Figure 1:
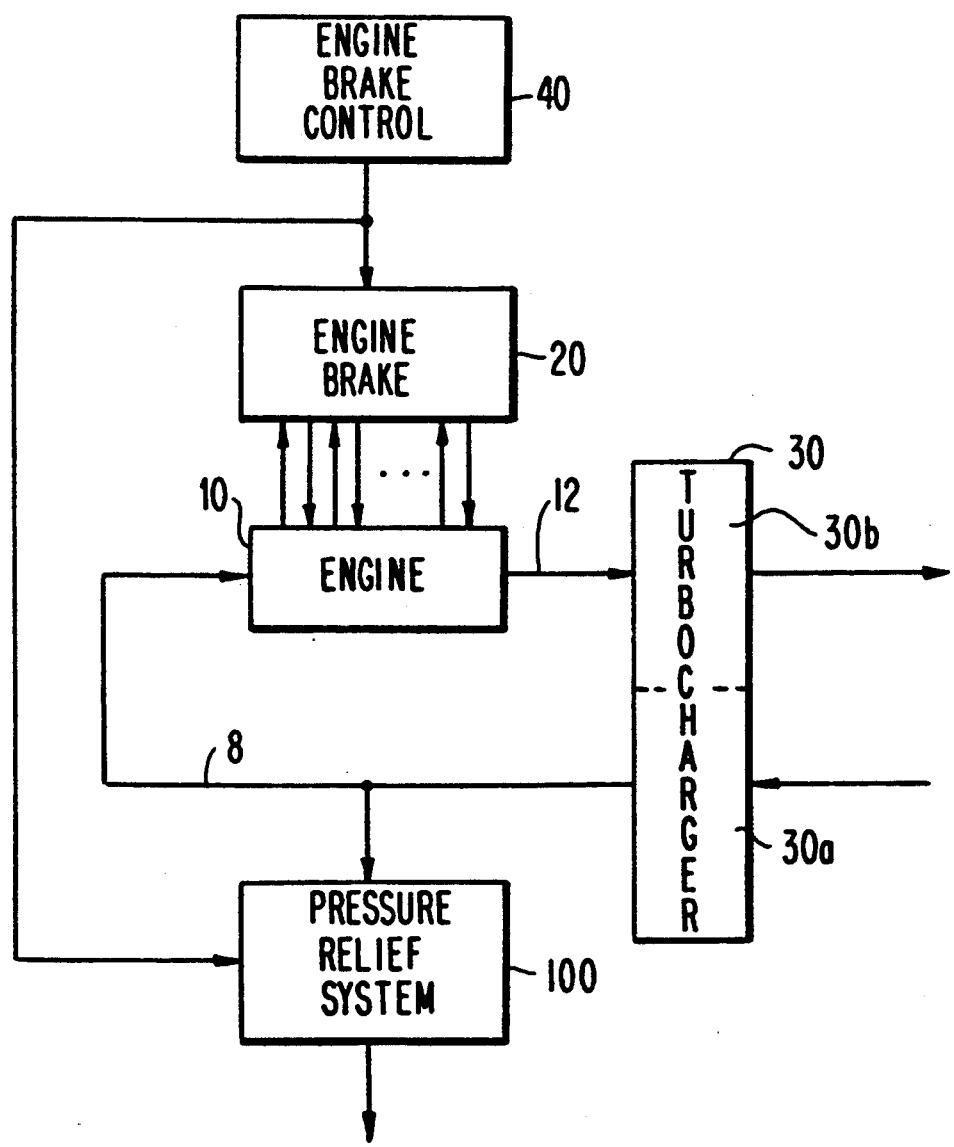
FIG. 1 is a block diagram of an illustrative turbocharged internal combustion engine equipped with an engine brake. The system of FIG. 1 can be constructed in accordance with the principles of this invention.

An illustrative turbocharged internal combustion engine 10 equipped with an engine brake 20 and an intake manifold pressure relief system 100 of this invention is shown in block diagram form in FIG. 1. In FIG. 1 elements 10, 20, 30, and 40 may be conventional. Air for supporting fuel combustion in engine 10 is drawn in through the pump portion 30a of turbocharger 30. From the turbocharger pump this air flows through the engine's intake manifold structure 8 to the intake valves (not separately shown) of engine 10. Exhaust manifold 12 conveys exhaust gas from the exhaust valves (also not separately shown) of engine 10 to the turbine portion 30b of turbocharger 30. In passing through the turbocharger the exhaust gas rotates a turbine in turbine portion 30b. This turbine in turn rotates a rotary pump in pump portion 30a, thereby increasing the pressure of the air in intake manifold 8. Increased intake manifold pressure increases the power available from engine 10 during normal power mode operation of the engine (i.e., while fuel is being supplied to the engine and engine brake 20 is not operating). The effectiveness of turbocharger 30 in increasing intake manifold pressure tends to increase substantially as engine speed increases.

When it is desired to operate the engine in engine braking mode, the fuel supply to engine 10 is cut off and engine brake control 40 is operated to turn on engine brake 20. As described in the background section of this specification, engine brake 20 uses certain appropriately timed motions in engine 10 as inputs to cause exhaust valves in the engine to open when those valves would not otherwise open during normal power mode operation of the engine. In particular, engine brake 20 opens these exhaust valves near top dead center of the compression strokes of the associated cylinders in order to release compressed gas from those cylinders and prevent the cylinders from recovering the work of compression during the subsequent expansion strokes of the cylinders. The engine therefore absorbs considerably more energy than it otherwise would and its effectiveness as a brake is substantially increased. Engine brake 20 typically includes hydraulic circuits for transferring the motions it receives from engine 10 to other portions of the engine to open exhaust valves in the engine as described above. Each such hydraulic circuit includes a master piston for receiving an input from engine 10 and a slave piston for applying an exhaust valve opening output to the engine.

Figure 2:
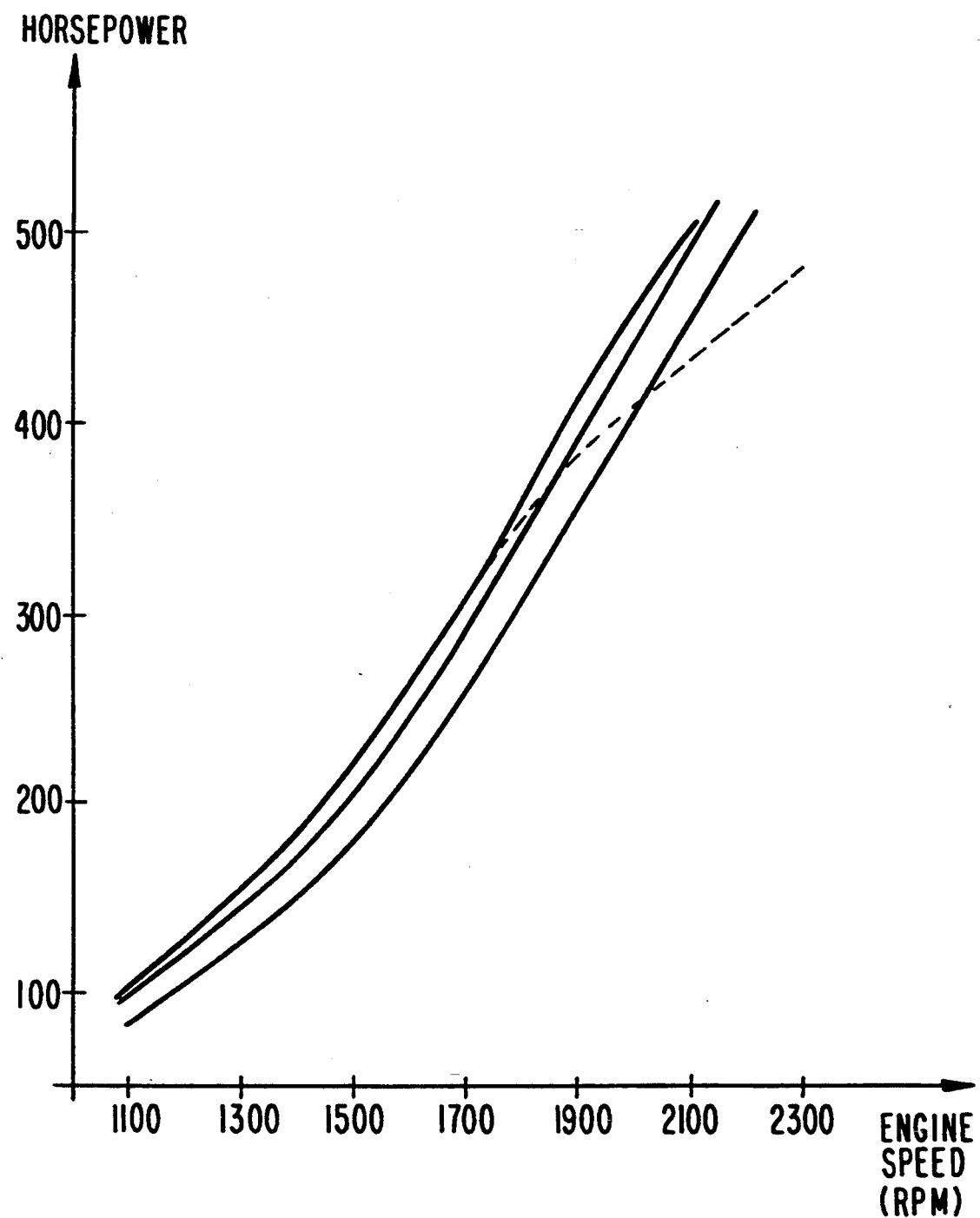
FIG. 2 is a diagram showing several possible engine braking horsepower characteristics achievable by the system of FIG. 1.
Figure 3:
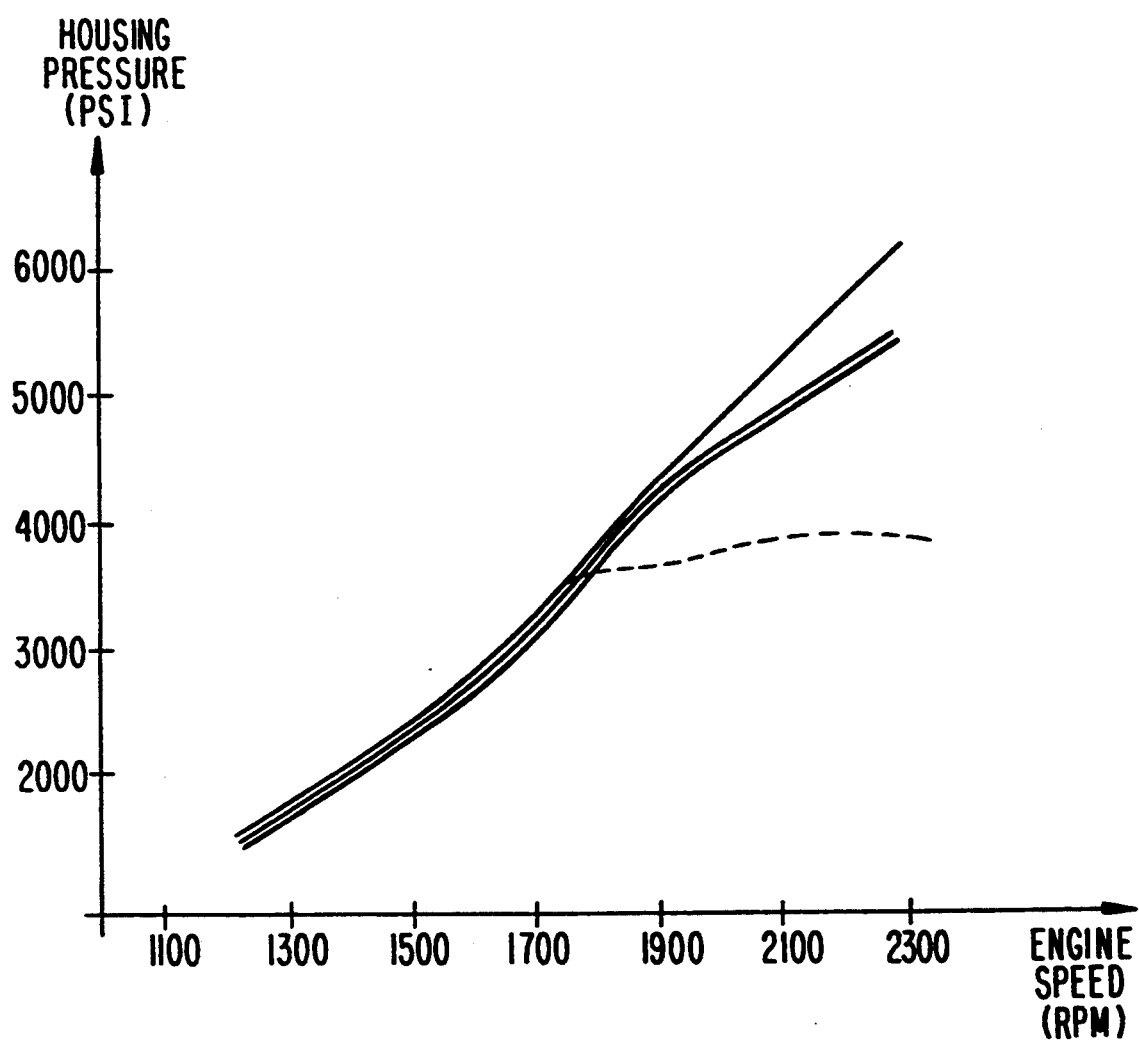
FIG. 3 is a diagram showing several different peak hydraulic pressure characteristics for the engine brake in the system of FIG. 1. These hydraulic pressure characteristics correspond, respectively, to the various engine braking horsepower characteristics shown in FIG. 2.

Even though no fuel is consumed during engine braking mode, turbocharger 30 is still effective, especially at higher engine speeds, to increase the intake manifold pressure. In the absence of this invention (as represented in FIG. 1 by pressure relief system 100), the increased intake manifold pressure produced by turbocharger 30 at higher engine speeds may limit the amount of engine braking that engine brake 20 can be set to produce at all engine speeds. This principle is illustrated by FIGS. 2 and 3. FIG. 2 shows in solid lines the braking horsepower available from engine 10 for three different settings of engine brake 20. The lowest solid line curve in FIG. 2 corresponds to setting engine brake 20 with a "lash" of 0.014 inch. The lash of engine brake 20 is the cold-engine clearance between each slave piston in the engine brake and the part of engine 10 acted on by that slave piston. In general, larger lash settings delay exhaust valve openings until closer to top dead center of the compression strokes, thereby increasing the engine braking available from the engine. This is shown by the middle and upper solid line curves in FIG. 2, which correspond to lash settings of 0.017 inch and 0.020 inch, respectively. Thus at 1700 RPM, for example, increasing the lash of engine brake 20 from 0.014 to 0.020 increases the available engine braking horsepower from approximately 260 HP to approximately 309 HP. Of course, all of the solid line curves in FIG. 2 are as steep as they are because engine 10 is turbocharged. Intake manifold pressure (and therefore engine cylinder pressure) consequently increases substantially with increased engine speed.

Although the solid line curves in FIG. 2 suggest that it is advantageous to increase the lash setting of engine brake 20 to increase the braking horsepower available from engine 10, any increase in engine braking horsepower requires the exertion of more force to open the exhaust valves. This is illustrated by the solid line curves in FIG. 3, which show the peak pressure in the hydraulic circuits in engine brake 20 associated with lash settings of 0.014 inch (lower curve), 0.017 inch (middle curve), and 0.020 inch (upper curve). Component stress limits in engine 10 or engine brake 20 typically limit the acceptable or desirable peak hydraulic pressure in engine brake 20. For example, it may be unacceptable or at least undesirable to exceed a peak hydraulic pressure of about 3800 psi. The solid line curves in FIG. 3 show that (in the absence of the present invention), any of the three depicted lash settings may produce peak hydraulic pressure in excess of 3800 psi at engine speeds above about 1850 RPM. Moreover, above about 1850 RPM, for any given engine speed, the amount by which the 3800 psi threshold is exceeded is increased by increasing the lash setting. Thus while it is advantageous to increase the lash setting of engine brake 20 to increase the available engine braking horsepower, undesirably high stresses may result in the engine or engine brake, particularly at higher engine speeds.

The above-described problem of high stress at higher engine speeds can be substantially eliminated by preventing turbocharger 30 from increasing the pressure in intake manifold 8 above a predetermined threshold level. For example, for the engine and engine brake system having the performance characteristics shown in FIGS. 2 and 3, the peak hydraulic pressure in the engine brake can be kept below about 3800 psi by limiting the pressure increase in intake manifold 8 produced by turbocharger 30 to about 150 kilopascals (about 22 psi). When intake manifold pressure is thus limited, the dotted line curve in FIG. 3 shows the peak hydraulic pressure in engine brake 20 for a lash setting of 0.020 inch. The dotted line in FIG. 2 shows the corresponding engine braking horsepower curve. The dotted line curve in FIG. 2 has the desirable characteristics that at low and moderate engine speeds the 0.020 inch lash setting results in substantially more engine braking than is possible with smaller lash settings such as 0.014 inch. At higher engine speeds (i.e., above about 1700 RPM) where the intake manifold "boost" produced by turbocharger 30 begins to be reduced, engine braking is somewhat less than would otherwise result from the 0.020 inch lash setting, but engine braking nevertheless continues to rise relatively smoothly with increased engine speed. This is important for smooth, stable, and predictable operation of the system and therefore the associated vehicle. To achieve this kind of performance characteristic, the pressure relief system 100 which limits the pressure rise in intake manifold 8 should be effective to impose an appropriate limit on intake manifold pressure, but should not cause any substantial sudden drops in intake manifold pressure when it begins to operate. In addition, system 100 should promptly respond to changes in engine speed, and should operate in a smooth and stable manner without undesirable under- or over-reaction. As will now be described with reference to FIGS. 4–6, the pressure relief system 100 of this invention has all of the foregoing attributes and therefore allows the apparatus of FIG. 1 to operate as shown by the dotted line curves in FIGS. 2 and 3.

Figure 4:
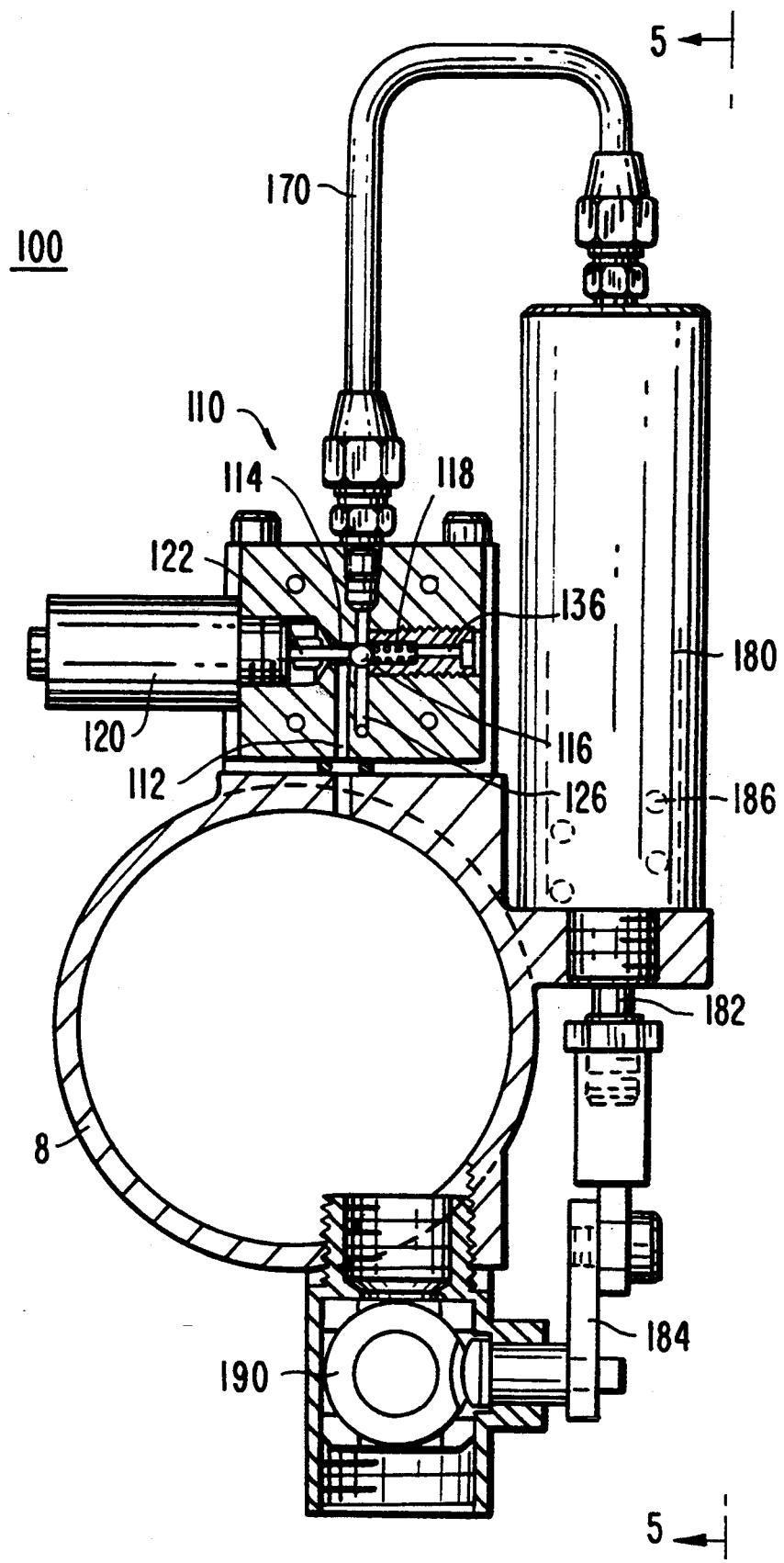
FIG. 4 is an elevational view, partly in section, of an illustrative intake manifold pressure relief system constructed in accordance with this invention.
Figure 5:
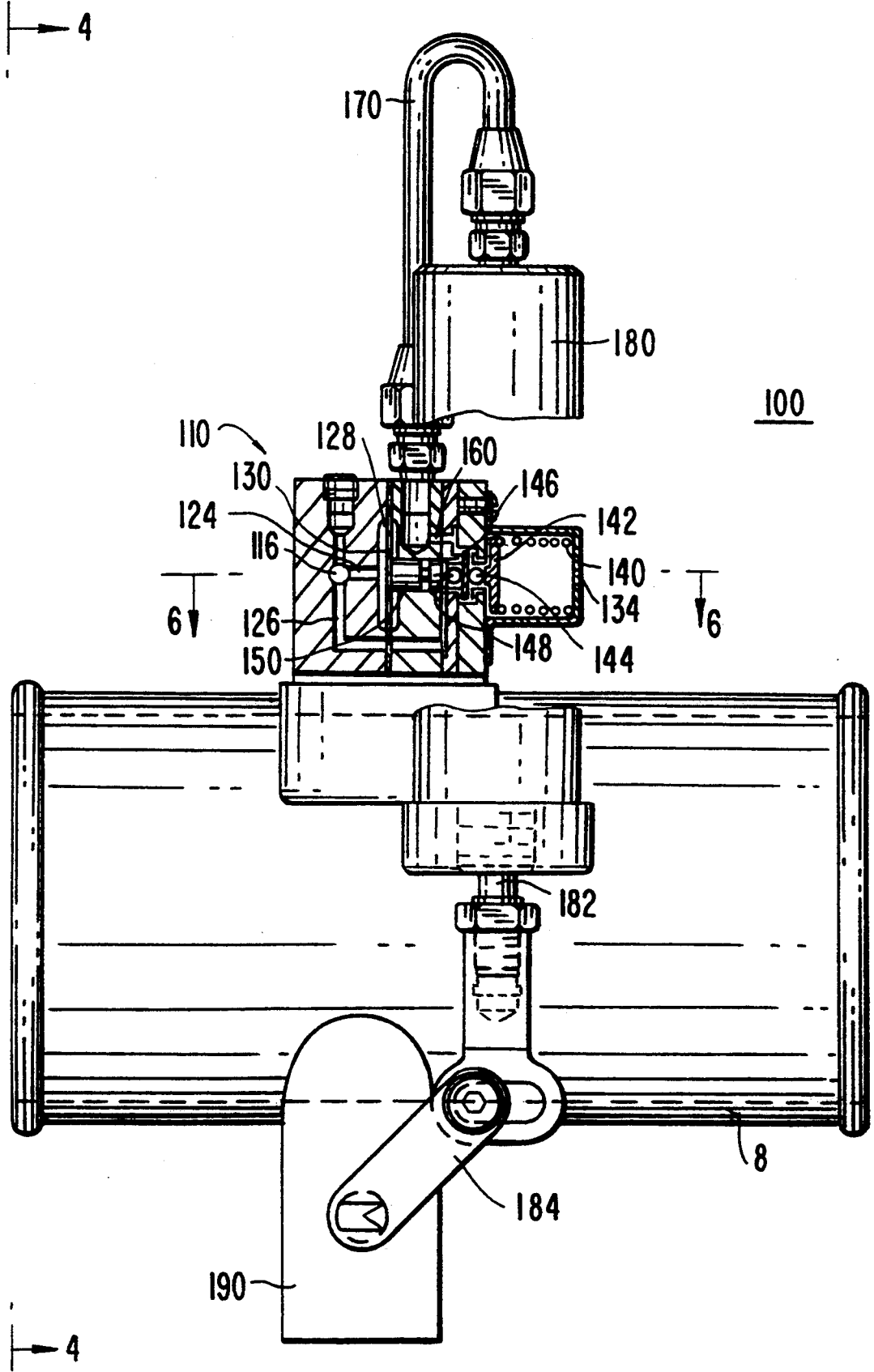
FIG. 5 is an elevational view, partly in section and partly fragmentary, taken in the direction indicated by the arrows 5—5 in FIG. 4.
Figure 6:
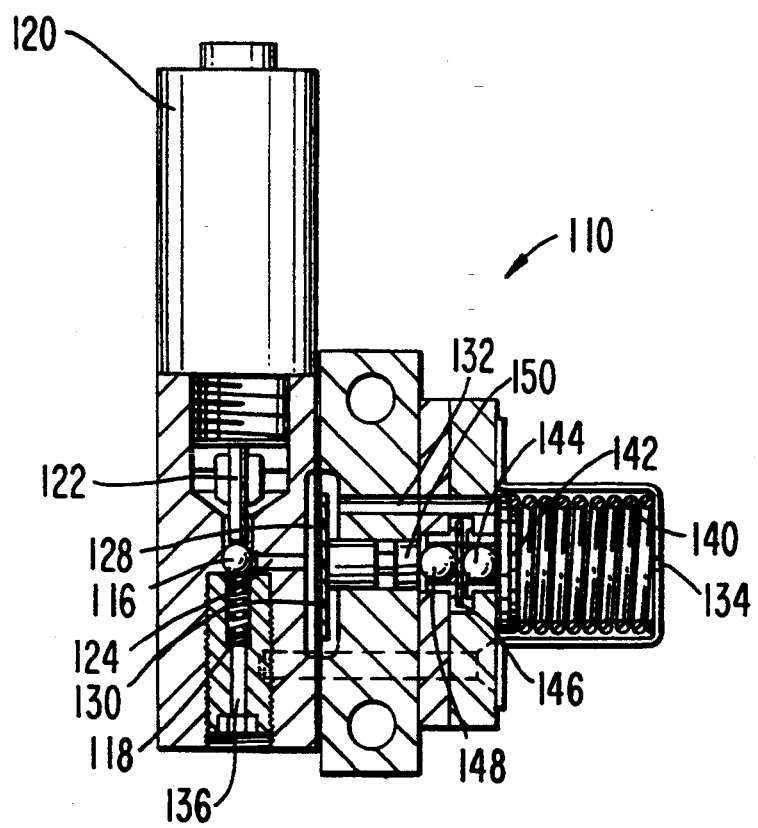
FIG. 6 is a sectional view taken along the line 6—6 in FIG. 5.
Figure 7:
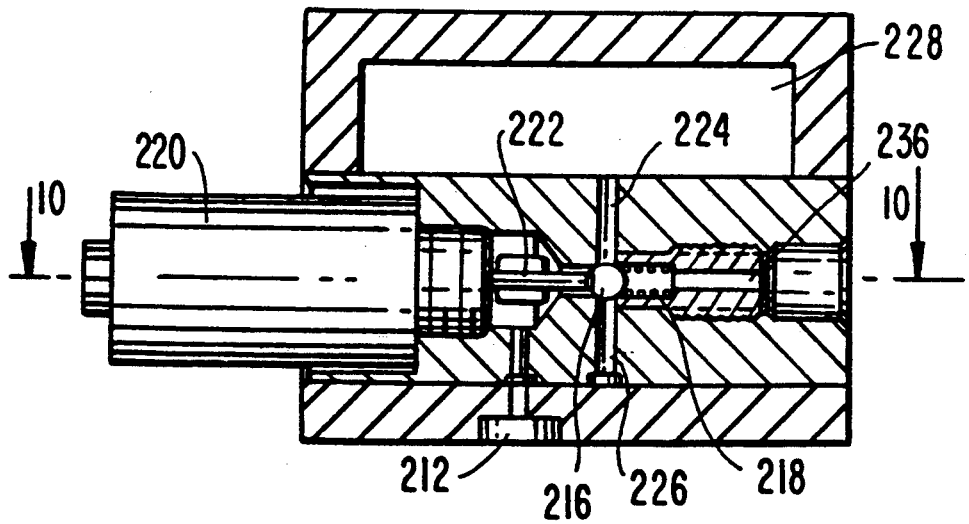
FIG. 7 is a sectional view of an alternative embodiment of a pressure sensor constructed in accordance with the principles of this invention.

As shown in FIGS. 4–6, an illustrative embodiment of the pressure relief system 100 of this invention includes a pressure sensor assembly 110 for sensing the pressure of the gas in intake manifold 8, and a ball valve 190 (operated by pneumatic actuator 180) for selectively releasing gas from intake manifold 8 in order to limit the pressure increase in manifold 8 produced by turbocharger 30 when engine brake 20 is turned on and the engine is turning at relatively high speed. As can be seen in FIG. 4, pressure sensor 110 has a gas passageway 112 which communicates with the interior of intake manifold 8. Passageway 112 leads to a transverse passageway 114 which is normally sealed by a ball 116. Ball 116 is resiliently urged toward the position which seals passageway 114 (i.e., toward the left as viewed in FIG. 4) by prestressed compression coil spring 118. When engine brake 20 is turned on by engine brake control 40 in FIG. 1, the engine brake control signal also energizes solenoid 120 (best seen in FIGS. 4 and 6). When thus energized, solenoid 120 acts through pin 122 to push ball 116 to the right in FIG. 4, thereby allowing gas from intake manifold 8 to flow through passageways 112 and 114 into passageways 124 and 126 (see especially FIG. 5). In this position, ball 116 also blocks vent passageway 136 which leads to the ambient atmosphere outside the system. When solenoid 120 is not energized, and ball 116 is accordingly pushed to the left in FIG. 4, passageways 124 and 126 are vented to the ambient atmosphere by passageway 136.

As shown in FIGS. 5 and 6, passageway 124 leads to one side of a chamber 128 which is subdivided by diaphragm 130. Accordingly, when solenoid 120 is energized as described above, gas from intake manifold 8 pushes on the left-hand side of diaphragm 130 as viewed in FIGS. 5 and 6 at substantially the pressure of the gas in the intake manifold. Opposing the tendency of the gas from manifold 8 to deflect diaphragm 130 to the right in FIGS. 5 and 6 is prestressed compression coil spring 140, which acts on the right-hand side of diaphragm 130 through plate 142, ball 144, valve plate 146, ball 148, and pin 150. Spring 140 is strong enough to keep valve plate 146 pressed against its left-hand seat as shown in FIGS. 5 and 6 until the intake manifold gas pressure pushing on the left-hand side of diaphragm 130 reaches the threshold pressure at which valve 190 should begin to open to substantially prevent further increase in the intake manifold pressure. When that threshold pressure is reached, diaphragm 130 deflects to the right, thereby acting through pin 150 and ball 148 to shift valve plate 146 from its left-hand seat to its right-hand seat. Note that the right-hand side of diaphragm 130 is always vented to atmosphere via passageway 132 (FIG. 6) and an aperture 134 in the housing for spring 140.

Passageway 126 communicates with valve plate 146 adjacent its left-hand seat so that passageway 126 is closed off when valve plate 146 is pressed against its left-hand seat by spring 140. When valve plate 146 shifts to its right-hand seat, however, gas can flow from passageway 126 into passageway 160. Passageway 160 communicates with pneumatic actuator 180 via conduit 170. Accordingly, when valve plate 146 is shifted to the right against its right-hand seat, intake manifold 8 gas flows through passageway 126, valve 146, passageway 160, and conduit 170 into pneumatic actuator 180. In response, actuator 180 extends its rod 182 by an amount proportional to the net flow of gas into the actuator. (Actuator 180 is a conventional type of pneumatic actuator having an internal piston (not shown) connected to rod 182. Pressurized gas applied to the actuator displaces the piston in order to extend rod 182 from the actuator. A return spring 186 in the actuator returns the piston and rod 182 to their initial positions when the pressurized gas is fully vented from the actuator.) Rod 182 acts through linkage 184 to open valve 190 by an amount proportional to the extension of rod 182. This releases gas from intake manifold 8 to reduce the increase in pressure in the intake manifold after valve 190 begins to open.

If the gas pressure in intake manifold 8 falls below the pressure required to keep valve 146 open, valve 146 shifts back from its right-hand seat to its left-hand seat as viewed in FIGS. 5 and 6. This allows pneumatic actuator 180 to vent to atmosphere via conduit 170, passageway 160, the open right-hand seat of valve 146, and aperture 134. As actuator 180 thus vents, return spring 186 retracts rod 182, thereby appropriately closing valve 190.

When engine brake 20 is turned off by engine brake control 40 in FIG. 1, solenoid 120 is de-energized. With solenoid 120 de-energized, spring 118 can shift ball 116 from its right-hand seat as viewed in FIG. 4 to its left-hand seat. This blocks the flow of intake manifold gas from passageway 112. At the same time that passageways 124 and 126 are thus cut off from passageway 112, passageways 124 and 126 are connected to vent passageway 136. This ensures that valve 146 will shift back to its left-hand seat (assuming that valve 146 was not already in that position when solenoid 120 was de-energized), thereby venting actuator 180 to atmosphere and closing valve 190. Valve 190 is thus always closed when engine brake 20 is not in operation.

As shown in FIGS. 4-6 it is preferable for the gas volume of actuator 180 to be relatively large in comparison to the rate at which gas can flow into the actuator or vent from the actuator via pressure sensitive valve assembly 110. Valve 146 has a relatively small excursion between its left-hand seat and its right-hand seat, and it tends to snap from one of those seats to the other in response to intake manifold pressure changes near the threshold pressure for actuation of assembly 110. Indeed, under some conditions, valve 146 may frequently switch back and forth between its two seats. However, because the gas passageways through assembly 110 are small in comparison to the gas volume of actuator 180, actuator 180 smoothes out the response of valve 146 by performing a time integration of the gas flow through assembly 110. While valve 146 is against its right-hand seat and gas is accordingly flowing from intake manifold 8 into actuator 180, actuator 180 is adding to the above-mentioned time integral and increasing the opening of valve 190. When intake manifold pressure falls below the threshold of assembly 110, valve 146 shifts back to its left-hand seat and begins to vent actuator 180 to the ambient atmosphere. Actuator 180 is then decreasing the above-mentioned time integral and correspondingly decreasing the opening of valve 190. It will thus be appreciated that the apparatus of this invention provides a highly stable, closed loop feedback system for controlling the pressure in intake manifold 8 in such a way that pressure is substantially prevented from rising significantly above the threshold pressure of assembly 110.

FIGS. 7-10 show an alternative embodiment of the pressure sensor portion 110 of the apparatus shown in FIGS. 4-6. Alternative pressure sensor 210 employs an aneroid capsule 230 to help render the pressure sensor insensitive to ambient pressure changes due to such factors as elevation and barometric pressure changes. Parts of pressure sensor 210 that are the same as or somewhat similar to parts of pressure sensor 110 have reference numbers that are increased by 100 from the reference numbers employed for the corresponding parts of pressure sensor 110. Pressure sensor 210 can be substituted for pressure sensor 110 in the apparatus shown in FIGS. 4 and 5.

Gas from intake manifold 8 enters pressure sensor 210 via gas passageway 212. As in sensor 110, passageway 212 is closed off from the remainder of sensor 210 by ball 216 unless solenoid 220 is energized. While solenoid 220 is not energized, spring 218 urges ball 216 against its left-hand seat as viewed in FIG. 7. This vents chamber 228 (which contains aneroid capsule 230) to the ambient atmosphere via passageways 224 and 236. (Aneroid capsule 230 is not shown in FIG. 7, but it is shown in appropriate subsequent FIGS.)

Aneroid capsule 230 is a thin metal chamber which includes two saucer-shaped diaphragms that are welded together at their edges. The space between these two diaphragms is evacuated. Deflection of the two diaphragms relative to one another is therefore referenced to the absolute pressure inside the aneroid capsule.

Figure 8:
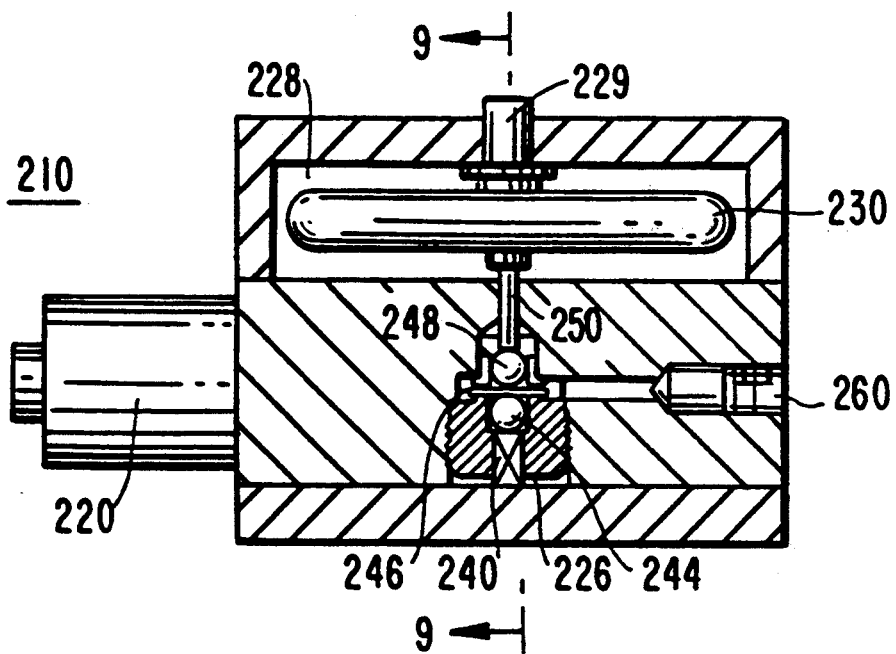
FIG. 8 is another sectional view of the pressure sensor shown in FIG. 7.
Figure 9:
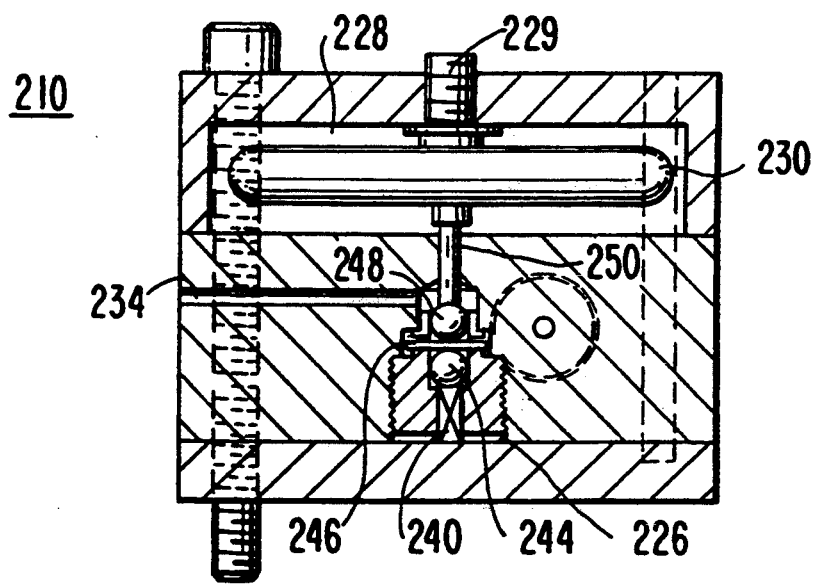
FIG. 9 is a sectional view taken along the line 9—9 in FIG. 8.
Figure 10:
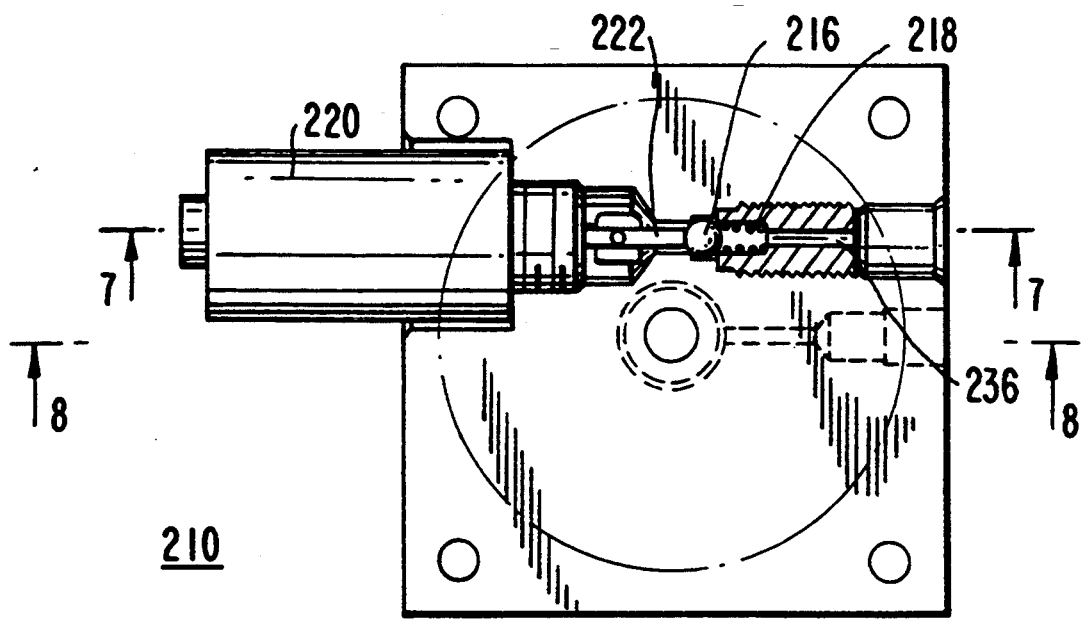
FIG. 10 is a plan view, partly in section, of the pressure sensor shown in FIGS. 7-9.

As can be seen in FIGS. 8 and 9, capsule 230 is mounted in chamber 228 on a pedestal 229. Pedestal 229 may be threaded through the wall of chamber 228 to facilitate adjustment of the pressure sensor. Opposite pedestal 229, capsule 230 acts on a series of elements which includes pin 250, ball 248, valve plate 246, ball 244, and (optionally) spring 240. As long as chamber 228 is vented to ambient atmosphere as described above, aneroid capsule 230 is flexed outwardly. In this condition, capsule 230 acts through pin 250 and ball 248 to press valve plate 246 against its lower seat as viewed in FIG. 8. This allows actuator 180 (FIGS. 4 and 5) to vent to ambient atmosphere via passageway 260, the open upper seat of valve plate 246, and passageway 234.

When solenoid 220 is energized (as a result of turning on engine brake 20 in FIG. 1), pin 222 pushes ball 216 from its left-hand seat to its right-hand seat. This closes vent passageway 236 and allows pressurized gas from intake manifold 8 to flow from passageway 212 through passageway 224 into chamber 228 where it surrounds aneroid capsule 230. Pressurized gas from passageway 212 also flows through passageway 226 to the lower seat of valve plate 246.

As long as the pressure of the intake manifold gas is below the pressure at which pressure relief system 100 (FIG. 1) should begin to release gas from the intake manifold in order to substantially prevent further intake manifold pressure increase, aneroid capsule 230 remains substantially unaffected by the intake manifold gas around it in chamber 228. However, when the intake manifold gas pressure reaches the threshold at which valve 190 (FIGS. 4 and 5) should begin to open, aneroid capsule 230 begins to deflect inwardly. This allows valve plate 246 to shift from its lower seat to it upper seat as viewed in FIGS. 8 and 9. When valve plate 246 is against its upper plate, vent passageway 234 is closed off and intake manifold gas flows from passageway 226 to actuator 180 via the open lower seat of valve plate 246 and passageway 260. When thus pressurized by intake manifold gas, actuator 180 begins to open valve 190 in the manner described above in connection with FIGS. 4-6.

Whenever the pressure in chamber 228 falls below the pressure required to partially collapse aneroid capsule 230, the resulting expansion of capsule 230 shifts valve plate 246 back to its lower seat, thereby shutting off the flow of pressurized intake manifold gas to actuator 180, and instead beginning to vent actuator 180 via passageway 234. De-energization of solenoid 220 when engine brake 20 is turned off also immediately begins venting chamber 228 and actuator 180.

From the foregoing it will be seen that, except for the use of aneroid capsule 230, pressure sensor 210 operates in substantially the same way as pressure sensor 110 to pressurize or vent actuator 180 as appropriate to open or close valve 190. Aneroid capsule 230 makes pressure sensor 210 less sensitive than pressure sensor 110 to ambient pressure changes.

It will be understood that the foregoing is only illustrative of the principles of the invention, and that various modifications can be made by those skilled in the art without departing from the scope and spirit of the invention. For example, turbocharger 30 may be augmented by an intercooler, and elements 110 and 190 may be disposed at any suitable location between the turbocharger pump and the intake valves of the engine. For convenience herein and in the appended claims, all such locations are referred to generically as the "intake manifold".

The invention claimed is:

1. Apparatus for selectively lowering gas pressure in an intake manifold of a turbocharged internal combustion engine that is equipped with a compression release engine brake during operation of the engine brake comprising:
   a first valve for selectively allowing some gas to escape from the intake manifold;
   a pneumatic actuator for opening said first valve;
   a second valve for selectively allowing gas to flow from said intake manifold to said actuator when the pressure of the gas in said intake manifold exceeds a predetermined threshold level, said actuator having a volume which is large in comparison to the rate at which gas flows into said actuator, and said second valve allowing gas to flow from said actuator when the pressure of the gas in said intake manifold is less than said predetermined threshold level; and
   means responsive to enablement of said engine brake for enabling said second valve to allow gas to flow from said intake manifold to said actuator when the pressure of the gas in said intake manifold exceeds said predetermined value.

2. The apparatus defined in claim 1 wherein, when the pressure of the gas in said intake manifold exceeds said predetermined threshold level, said second valve applies gas from said intake manifold to said actuator through a passageway which is small in comparison to said volume of said actuator.

3. The apparatus defined in claim 1 wherein said second valve comprises:
   a valve member movable between a first position in which said valve member prevents gas from flowing from said intake manifold to said actuator and a second position in which said valve member allows gas to flow from said intake manifold to said actuator;
   a spring for resiliently urging said valve member to move toward said first position; and
   an operator member responsive to the pressure of the gas in said intake manifold for urging said valve member to move, in opposition to the urging of said spring, toward said second position with a force proportional to the pressure of the gas in said intake manifold.

4. The apparatus defined in claim 1 wherein said actuator includes a spring for opposing the pressure of the gas applied to said actuator by resiliently urging said actuator to close said first valve.

5. The apparatus defined in claim 1 wherein said means responsive to enablement of said engine brake comprises means for opening a passageway between said intake manifold and said second valve when said engine brake is enabled.

6. The apparatus defined in claim 1 wherein said means responsive to enablement of said engine brake comprises a solenoid operated valve for allowing gas to flow from said intake manifold to said second valve only when said solenoid is energized by enablement of said engine brake.

7. The apparatus defined in claim 3 wherein said means responsive to enablement of said engine brake comprises:
   a third valve for applying gas from said intake manifold to said operator member only when said engine brake is enabled.

8. The apparatus defined in claim 7 wherein said third valve allows said operator member to communicate with ambient atmosphere when said engine brake is not enabled.

9. The apparatus defined in claim 7 wherein said third valve is a solenoid operated valve, and wherein said solenoid is energized in order to allow gas to flow from said intake manifold to said operator member only when said engine brake is enabled.

10. The apparatus defined in claim 9 wherein said third valve comprises:
    a valve member movable between a first position in which said valve member prevents gas from flowing from said intake manifold to said operator member and a second position in which said valve member allows gas to flow from said intake manifold to said operator member, said solenoid causing said valve member to move from said first position to said second position when said solenoid is energized; and
    a spring for resiliently urging said valve member to move from said second position to said first position when said solenoid is not energized.

11. The apparatus defined in claim 10 wherein said valve member is a ball.

12. The apparatus defined in claim 3 wherein said valve member is a substantially flat plate, wherein said spring acts on a first side of said plate through a first ball interposed between said spring and said first side, and wherein said operator member acts on a second side of said plate opposite said first ball through a second ball interposed between said operator member and said second side.

13. The apparatus defined in claim 1 wherein said second valve allows gas to flow from said actuator to ambient atmosphere via a conduit connected to said actuator which communicates with ambient atmosphere when the pressure of the gas in said intake manifold is less than said predetermined threshold level.

14. The apparatus defined in claim 3 wherein said valve member allows gas to flow from said actuator to ambient atmosphere via a conduit connected to said actuator which communicates with ambient atmosphere when said valve member is in said first position.

15. The apparatus defined in claim 1 wherein said second valve comprises:

a valve member movable between a first position in which said valve member prevents gas from flowing from said intake manifold to said actuator and a second position in which said valve member allows gas to flow from said intake manifold to said actuator; and aneroid means in communication with gas in an associated chamber for urging said valve member to move toward said first position unless the pressure of the gas in said chamber exceeds said predetermined threshold pressure, in which case said aneroid means deflects to allow said valve member to move toward said second position; and wherein said means responsive to enablement of said engine brake comprises means for opening a gas passageway between said intake manifold and said chamber when said engine brake is enabled so that said aneroid means communicates with gas from said intake manifold.

16. The apparatus defined in claim 15 wherein said means responsive to enablement of said engine brake comprises means for venting said chamber when said engine brake is not enabled.

17. The apparatus defined in claim 15 wherein said valve member allows gas to flow from said actuator to ambient atmosphere via a conduit connected to said actuator which communicates with ambient atmosphere when said valve member is in said first position.

* * * * *